(12) United States Patent
Leuwer et al.

(10) Patent No.: US 11,671,463 B2
(45) Date of Patent: Jun. 6, 2023

(54) DEVICE FOR PROCESSING DATA INCLUDING AT LEAST TWO DATA INTERFACES, AND OPERATING METHOD THEREFOR

(71) Applicant: Robert Bosch GmbH, Stuttgart (DE)

(72) Inventors: Herbert Leuwer, Gross Kummerfeld (DE); Janin Wolfinger, Birkenfeld (DE); Michael Buchalik, Echterdingen (DE); Thomas Wollenhaupt, Backnang (DE); Timo Lothspeich, Weissach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 216 days.

(21) Appl. No.: 17/170,568

(22) Filed: Feb. 8, 2021

(65) Prior Publication Data
US 2021/0258352 A1 Aug. 19, 2021

(30) Foreign Application Priority Data
Feb. 18, 2020 (DE) .......................... 102020201988.6

(51) Int. Cl.
*H04L 9/40* (2022.01)
*H04L 67/12* (2022.01)
*H04L 12/40* (2006.01)

(52) U.S. Cl.
CPC ...... *H04L 63/205* (2013.01); *H04L 12/40032* (2013.01); *H04L 63/164* (2013.01); *H04L 67/12* (2013.01); *H04L 2012/40215* (2013.01); *H04L 2012/40241* (2013.01)

(58) Field of Classification Search
CPC ............ H04L 63/205; H04L 12/40032; H04L 63/164; H04L 67/12; H04L 2012/40215; H04L 2012/40241
USPC ............................................................. 726/1
See application file for complete search history.

(56) References Cited

U.S. PATENT DOCUMENTS

| 2015/0020152 A1 | 1/2015 | Litichever et al. |
| 2016/0301714 A1 | 10/2016 | Molter et al. |
| 2018/0205703 A1 | 7/2018 | Grau |
| 2019/0379683 A1* | 12/2019 | Overby ................. H04L 9/3265 |
| 2019/0394089 A1* | 12/2019 | Barrett ................ H04W 12/088 |

FOREIGN PATENT DOCUMENTS

| DE | 112012004770 T5 | 8/2014 |
| EP | 1309132 A1 | 5/2003 |

* cited by examiner

*Primary Examiner* — Bryan F Wright
(74) *Attorney, Agent, or Firm* — Norton Rose Fulbright US LLP; Gerard Messina (57) ABSTRACT

A device for processing data, including at least two data interfaces, a first data interface of the at least two data interfaces being designed to at least temporarily exchange first data with at least one first external unit according to a first communication protocol, in particular CAN and/or FlexRay and/or LIN and/or MOST and/or Ethernet, a second data interface of the at least two data interfaces being designed to at least temporarily exchange data with a second external unit and/or the first external unit according to a second communication protocol, which is different than the first communication protocol, the device including a security unit, which is designed to at least temporarily carry out at least one security function with regard to at least one of the at least two data interfaces.

20 Claims, 6 Drawing Sheets

DEVICE FOR PROCESSING DATA INCLUDING AT LEAST TWO DATA INTERFACES, AND OPERATING METHOD THEREFOR

CROSS REFERENCE

The present application claims the benefit under 35 U.S.C. § 119 of German Patent Application No. DE 102020201988.6 filed on Feb. 18, 2020, which is expressly incorporated herein by reference in its entirety.

FIELD

The present invention relates to a device for processing data, including at least two data interfaces.

The present invention further relates to a method for processing data.

SUMMARY

Preferred specific embodiments of the present invention relate to a device for processing data, including at least two data interfaces, a first data interface of the at least two data interfaces being designed to at least temporarily exchange (e.g., transmit and/or receive) first data with at least one first external unit according to a first communication protocol, in particular CAN (and/or CAN-FD or CAN-XL) and/or FlexRay and/or LIN and/or MOST and/or Ethernet, a second data interface of the at least two data interfaces being designed to at least temporarily exchange (e.g., transmit and/or receive) data with a second external unit (and/or the first external unit) according to a second communication protocol, which is, in particular, different than the first communication protocol, the device including a security unit, which is designed to at least temporarily carry out a security function with regard to at least one of the at least two data interfaces.

In further preferred specific embodiments of the present invention, the second communication protocol may also be identical to the first communication protocol.

In further preferred specific embodiments of the present invention, the security unit is designed to at least temporarily carry out at least one security function with regard to both of the at least two data interfaces. In particular, a cross-protocol execution of the at least one security function is made possible thereby.

In further preferred specific embodiments of the present invention, it is provided that the at least one security function includes at least one of the following functions: a) firewall function; b) attack detection, in particular intrusion detection (ID); c) attack prevention, in particular intrusion prevention (IP); d) attack detection and prevention, in particular intrusion detection and prevention, (IDP); e) packet inspection (PI); in particular, deep packet inspection (DPI); f) stateful packet inspection (SPI).

In further preferred specific embodiments of the present invention, it is provided that the security unit is designed to carry out the at least one security function in a cross-protocol and/or protocol-independent manner.

In further preferred specific embodiments of the present invention, it is provided that the security unit is implemented at least partially, preferably entirely, in hardware, in particular as a hardware circuit. As a result, a hardware-based design, e.g., of the aforementioned functions or security functions, is advantageously possible.

In further preferred specific embodiments of the present invention, it is provided that the security unit includes at least one of the following elements: a) hardware circuit; b) programmable logic array, e.g., field-programmable gate array (FPGA); c) application-specific integrated circuit (ASIC).

In further preferred specific embodiments of the present invention, it is provided that the security unit includes a) at least one, in particular protocol-independent, hardware filter and/or b) is designed to define at least one or the at least one hardware filter, the at least one hardware filter, in particular, being at least temporarily usable to filter at least one part of the first data and/or the second data and/or further data, the first data and/or the second data being associated, in particular, with different communication protocols. A cross-protocol, hardware-based filtering of the first data and/or the second data is advantageously made possible thereby.

In further preferred specific embodiments of the present invention, it is provided that the security unit is designed to evaluate at least one part of the first data and/or the second data, the security unit being designed, in particular, to infer a context of a target system for the device, based on the evaluation, the security unit being designed, in particular, to influence an execution of the at least one security function, based on the evaluation and/or the context, and/or to vary a configuration of the security unit and/or the at least one security function. In further preferred specific embodiments, the evaluation and/or the inference and/or the influencing may also take place in a cross-protocol and/or hardware-based manner.

In further preferred specific embodiments of the present invention, it is provided that the security unit is configured to carry out a check of data or messages, in particular header information, which are associated with Ethernet-based protocols and/or other protocols, in particular DoIP and/or SomeIP and/or TCP/IP. In further preferred specific embodiments, one or multiple of these steps may also be carried out in a cross-protocol and/or hardware-based manner.

In further preferred specific embodiments of the present invention, it is provided that the security unit is designed to monitor and/or analyze and/or report a sequence of multiple, in particular predefinable, messages of the first data interface and/or the second data interface. In further preferred specific embodiments, one or multiple of these steps may also be carried out in a cross-protocol and/or hardware-based manner.

In further preferred specific embodiments of the present invention, it is provided that the security unit is designed to monitor whether a predefinable sequence of, in particular predefinable, messages occurs at the first data interface and/or the second data interface, the security unit being designed, in particular, to initiate a response if the predefinable sequence does not occur or does not occur within a predefinable time, the response including, in particular, at least one of the following elements: a) limiting a data rate of at least one of the at least two data interfaces; b) at least temporarily deactivating at least one of the at least two data interfaces; c) recording the data traffic, in particular around the predefinable time, by which, in particular, a subsequent, possibly more detailed, analysis (in particular the attack data) is made possible; d) reporting and/or logging malfunctions or events, e.g., in hardware registers. In further preferred specific embodiments, one or multiple of these steps may also be carried out in a cross-protocol and/or hardware-based manner.

In further preferred specific embodiments of the present invention, it is provided that the device, in particular the security unit, includes at least one state machine, and/or the device, in particular the security unit, is designed to at least temporarily define or implement at least one state machine. In further preferred specific embodiments, one or multiple of these steps may also be carried out in a cross-protocol and/or hardware-based manner.

In further preferred specific embodiments of the present invention, it is provided that the device, in particular the security unit, is designed to monitor, with the aid of the at least one state machine, one or multiple messages of at least one stateful communication protocol, which is at least temporarily assignable or assigned to at least one of the at least two data interfaces, and/or to simulate and/or monitor state sequences of the at least one stateful communication protocol. In further preferred specific embodiments, one or multiple of these steps may also be carried out in a cross-protocol and/or hardware-based manner.

In further preferred specific embodiments of the present invention, it is provided that the device, in particular the security unit, is designed to at least temporarily monitor and/or limit a data rate and/or packet frequency and/or carry out further policing functions. In further preferred specific embodiments, one or multiple of these steps may also be carried out in a cross-protocol and/or hardware-based manner.

In further preferred specific embodiments of the present invention, it is provided that the device, in particular the security unit, includes at least one counter, and/or the device, in particular the security unit, is designed to at least temporarily define or implement at least one counter, the device being designed, in particular, to use the at least one counter at least temporarily to count events. In further preferred specific embodiments, one or multiple of these steps may also be carried out in a cross-protocol and/or hardware-based manner.

In further preferred specific embodiments of the present invention, it is provided that the device, in particular the security unit, is designed to at least temporarily link the at least one security function to at least one of the at least two data interfaces. In further preferred specific embodiments, one or multiple of these steps may also be carried out in a cross-protocol and/or hardware-based manner.

In further preferred specific embodiments of the present invention, it is provided that the device, in particular the security unit, is designed to a) at least temporarily limit, for at least one data interface of the at least two data interfaces, a data rate and/or packet frequency of packets arriving at the at least one data interface and/or going out from the at least one data interface; and/or b) at least temporarily block at least one data interface of the at least two data interfaces, denial of service (DoS) attacks on the at least one data interface, in particular, being prevented and/or made more difficult. In further preferred specific embodiments, one or multiple of these steps may also be carried out in a cross-protocol and/or hardware-based manner.

In further preferred specific embodiments of the present invention, it is provided that the device, in particular the security unit, is designed to dynamically configure and/or reconfigure at least one component of the device, in particular the security unit. This may take place, for example, using at least one configuration register (e.g., implementable in the form of a register memory), to which, e.g., dynamically different configuration data are loadable. In further preferred specific embodiments, one or multiple of these steps may also be carried out in a cross-protocol and/or hardware-based manner.

In further preferred specific embodiments of the present invention, it is provided that the device, in particular the security unit, is designed to at least temporarily monitor and/or evaluate a data traffic between at least two data interfaces, which are each assigned to different communication protocols, the device, in particular the security unit, being designed, in particular, to generate a diagram, in particular a heat map, or data characterizing a diagram, based on the monitored and/or evaluated data traffic. In further preferred specific embodiments, one or multiple of these steps may also be carried out in a cross-protocol and/or hardware-based manner.

In further preferred specific embodiments of the present invention, it is provided that the device includes at least one evaluation unit, which is designed to evaluate the first and/or second data and/or data derived from the first and/or second data, the evaluation unit being designed, in particular, to carry out at least one software-based function. In further preferred specific embodiments, one or multiple of these steps may also be carried out in a cross-protocol manner.

Further preferred specific embodiments of the present invention relate to a method for processing data, in particular data packets of different communication protocols, in particular in a vehicle, in particular a motor vehicle, including the at least temporary use of at least one device according to at least one of the above embodiments.

Further preferred specific embodiments of the present invention relate to a use of the device according to the specific embodiments and/or the method according to the specific embodiments for at least one of the following elements: a) monitoring, in particular hardware-based and/or hardware-accelerated monitoring, of a data traffic, in particular of data packets of different communication protocols, in particular in a vehicle, in particular a motor vehicle; b) ascertaining and/or detecting a context of a target system; c) hardware-based and/or hardware-accelerated monitoring of a violation of firewall rules; d) hardware-based and cross-protocol filtering of data packets; e) preventing denial of service (DoS) attacks, in particular on the at least one data interface, and/or making them more difficult.

Additional features, application possibilities and advantages of the present invention are derived from the following description of exemplary embodiments of the present invention, which are illustrated in the figures. All features described or illustrated form the object of the present invention alone or in any arbitrary combination, regardless their wording in the description or illustration in the figures.

DETAILED DESCRIPTION OF EXAMPLE EMBODIMENTS

Figure 1:
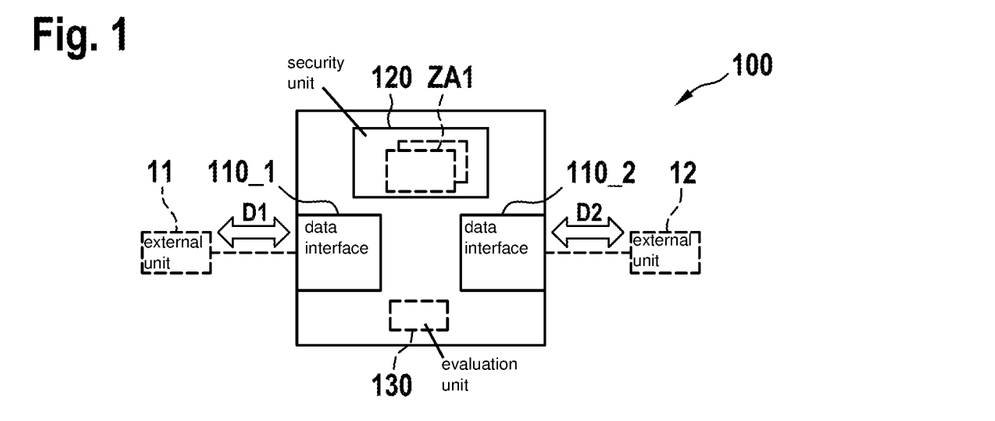
FIG. 1 schematically shows a simplified block diagram according to preferred specific embodiments of the present invention.

FIG. 1 schematically shows a simplified block diagram of a device 100 for processing data according to preferred specific embodiments, including at least two data interfaces 110_1, 110_2, a first data interface 100_1 of the at least two data interfaces being designed to at least temporarily exchange (e.g., transmit and/or receive) first data D1 with at least one first external unit 11 according to a first communication protocol, in particular CAN and/or FlexRay and/or LIN and/or MOST and/or Ethernet, a second data interface 110_2 of the at least two data interfaces being designed to at least temporarily exchange (e.g., transmit and/or receive) second data D2 with a second external unit 12 (and/or the (same) first external unit 11) according to a second communication protocol, which is, in particular, different than the first communication protocol, the device 100 including a security unit 120, which is designed to at least temporarily carry out a security function with regard to at least one of the at least two data interfaces 110_1, 110_2.

In further preferred specific embodiments, the security unit 120 is designed to at least temporarily carry out at least one security function SF with regard to both of the at least two data interfaces 110_1, 110_2. In particular, a cross-protocol execution of the at least one security function is made possible thereby.

Figure 3A:
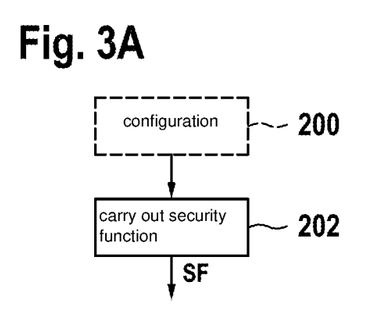
FIG. 3A schematically shows a simplified flowchart according to further preferred specific embodiments of the present invention.

For this purpose, FIG. 3A schematically shows a simplified flowchart according to further preferred specific embodiments. An optional configuration of device 100 or, for example, its security unit 120, takes place in step 200 (FIG. 1), and security unit 120 carries out the at least one security function SF in step 202 (FIG. 3A).

Figure 3B:
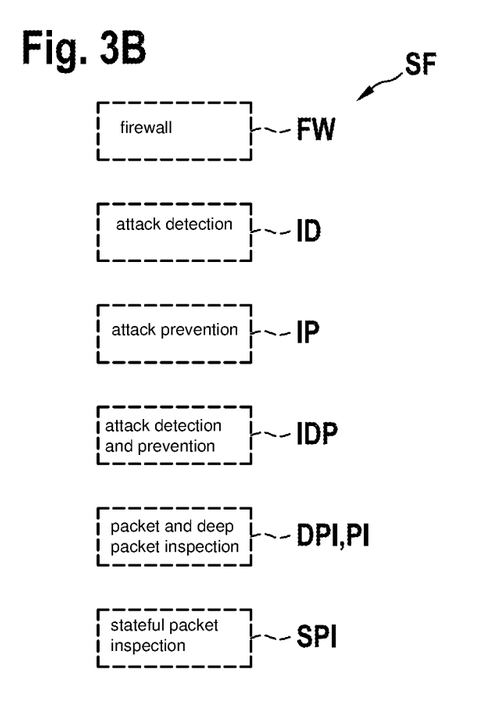
FIGS. 3B through 3N schematically show a simplified flowchart according to further preferred specific embodiments of the present invention.

In further preferred specific embodiments (cf. FIG. 3B), it is provided that the at least one security function SF includes at least one of the following functions: a) firewall function (FW); b) attack detection (ID), in particular intrusion detection (ID); c) attack prevention (IP), in particular intrusion prevention (IP); d) attack detection and prevention (IDP), in particular intrusion detection and prevention, (IDP); e) packet inspection (PI); in particular deep packet inspection (DPI); f) stateful packet inspection (SPI).

In further preferred specific embodiments, it is provided that security unit 120 (FIG. 1) is designed to carry out the at least one security function SF in a cross-protocol manner (in particular, also different communication protocols) and/or a protocol-independent manner. In this way, for example predefinable, in particular the same, firewall functions or firewall rules may be carried out on, for example, CAN data frames (cf., e.g., first data D1 from FIG. 1) as well as on Ethernet data frames (cf., e.g., second data D2 from FIG. 1).

In further preferred specific embodiments, it is provided that security unit 120 (FIG. 1) is implemented at least partially, preferably entirely, in hardware, in particular as a hardware circuit. As a result, a hardware-based execution, e.g., of the aforementioned functions or security functions, is advantageously possible.

In further preferred specific embodiments, it is provided that security unit 120 includes at least one of the following elements: a) hardware circuit; b) programmable logic array, e.g., field-programmable gate array (FPGA); c) application-specific integrated circuit (ASIC).

Figure 2:
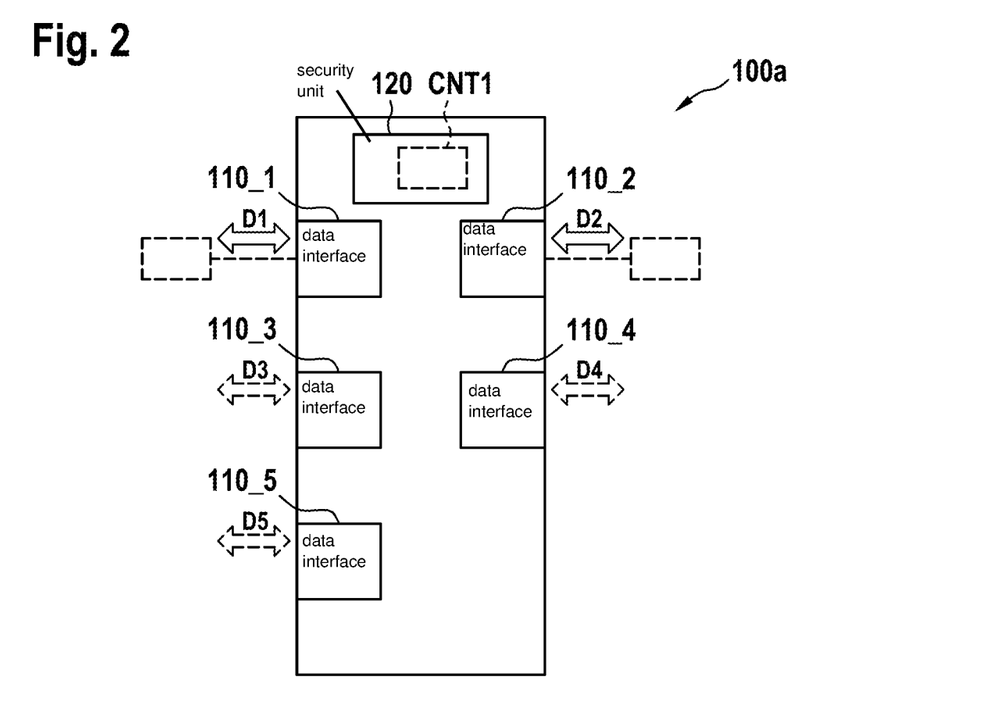
FIG. 2 schematically shows a simplified block diagram according to further preferred specific embodiments of the present invention.

FIG. 2 shows an example of a device 100*a* according to further preferred specific embodiments. It differs from device 100 according to FIG. 1, for example by its number of data interfaces 110_1, 110_2, 110_3, 110_4, 110_5 (five in the present case). In device 100*a*, the functionalities described above with reference to FIG. 1 are correspondingly applicable, preferably to all five data interfaces 110_1, 110_2, 110_3, 110_4, 110_5, so that, for example, one or multiple security functions SF may be carried out in a cross-protocol and hardware-based manner on data D1, D2, D3, D4, D5, which device 100*a* receives and/or transmits.

Devices 100, 100*a* according to preferred specific embodiments may be used in further preferred specific embodiments, for example, as a gateway for one or multiple control units or for at least one bus system or other communication system, in particular of a motor vehicle.

Figure 5A:
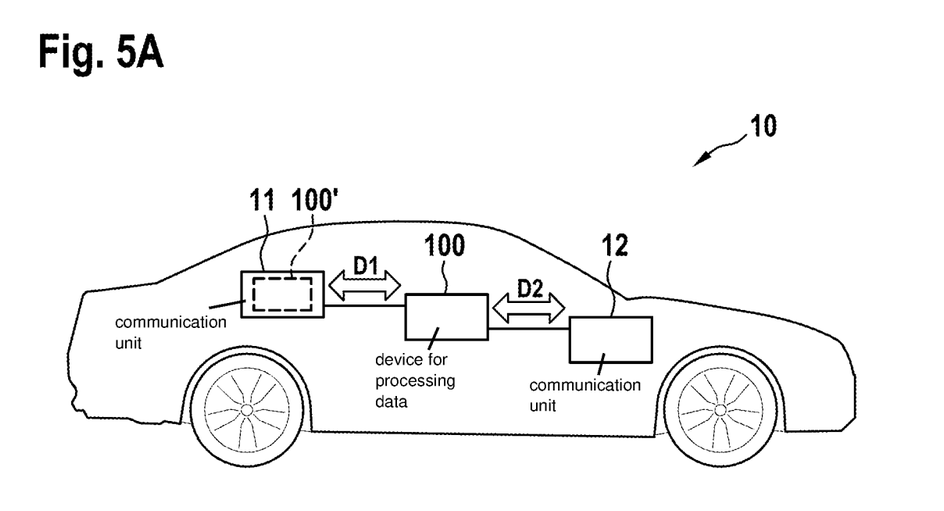

FIG. 5A shows an example of the arrangement of device 100 in a motor vehicle 10 as the target system. In the present case, two communication units 11, 12, which may be, for example, control units of motor vehicle 10, are coupled with the aid of device 100, cf. data D1, D2 indicated symbolically as block arrows. A device according to the specific embodiments may also be optionally integrated into at least one control unit 11, cf. reference numeral 100'.

Figure 5B:
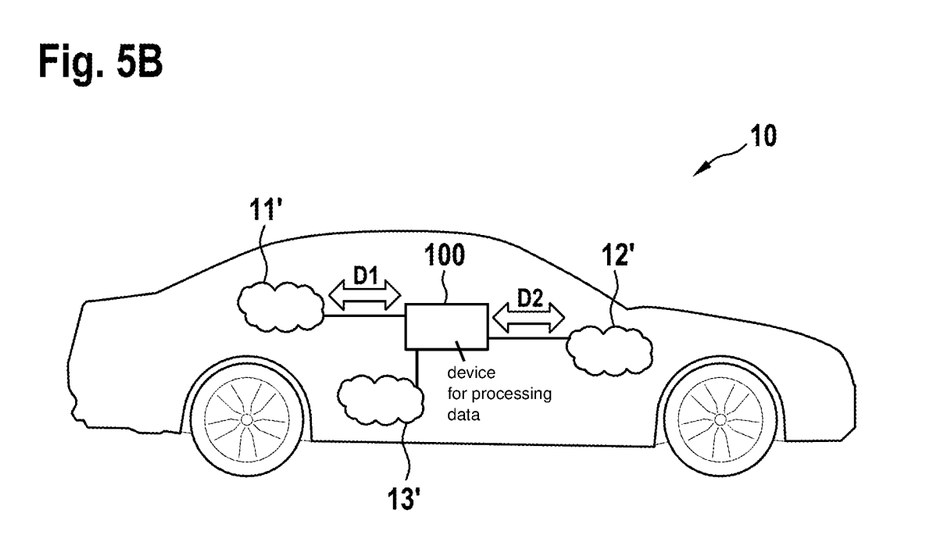
FIG. 5B schematically shows a simplified block diagram of a system according to further preferred specific embodiments of the present invention.

FIG. 5B shows an example of the arrangement of device 100 in motor vehicle 10 as the target system, multiple bus systems 11', 12', 13' of the motor vehicle being coupled with each other with the aid of device 100.

Mixed forms of the specific embodiments described above as examples with reference to FIGS. 5A, 5B may also be provided in further preferred specific embodiments.

Figure 3C:
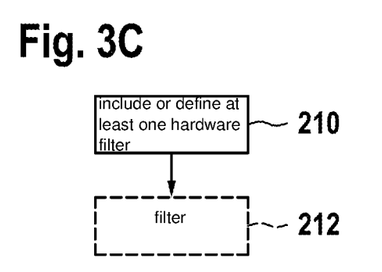
Figure 4:
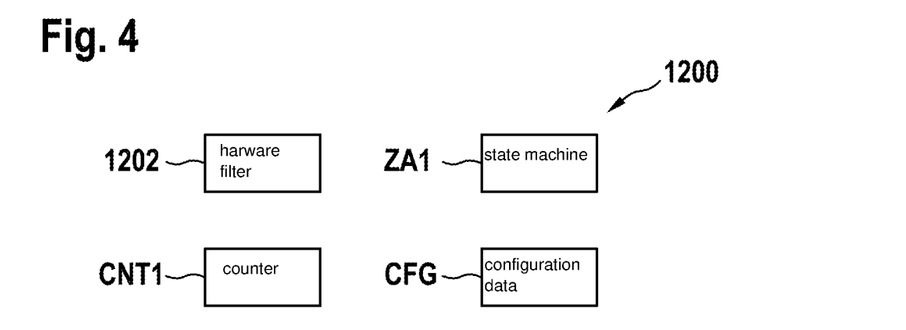
FIG. 4 schematically shows aspects according to further preferred specific embodiments of the present invention FIG. 5A schematically shows a simplified block diagram of a system according to further preferred specific embodiments of the present invention.

In further preferred specific embodiments (cf. FIG. 4), it is provided that security unit 1200 includes a) at least one, in particular protocol-independent, hardware filter 1202 and/or b) is designed to define at least one or the at least one hardware filter 1202 (cf. Step 210 from FIG. 3C), the at least one hardware filter 1202 (FIG. 4), in particular, being at least temporarily usable to filter at least one part of first data D1 (FIG. 1) and/or second data D2 and/or further data D3, D4, D5 (FIG. 2) (cf. optional step 212 according to FIG. 3C), first data D1 and/or second data D2 being associated, in particular, with different communication protocols. A cross-protocol, hardware-based filtering of first data D1 and/or second (and/or further) data D2, D3, D4, D5 is advantageously made possible thereby.

In further preferred specific embodiments (cf. FIG. 4), it is provided that security unit 1200 includes at least one state machine ZA1, by which, for example, states of stateful communication protocols may be simulated or monitored. State machine ZA1 may preferably be implemented with the aid of hardware.

In further preferred specific embodiments (cf. FIG. 4), it is provided that security unit 1200 includes at least one counter CNT1.

In further preferred specific embodiments (cf. FIG. 4), it is provided that security unit 1200 includes configuration data CFG, for example for optional configuration 200 according to FIG. 3A.

Figure 3D:
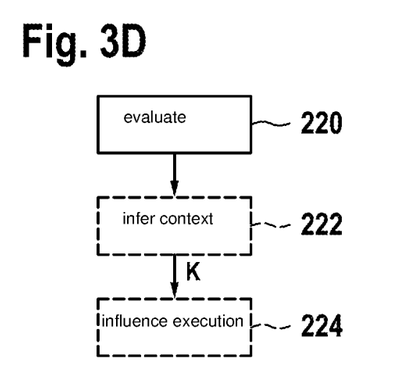

In further preferred specific embodiments (cf. FIG. 3D), it is provided that security unit 120 (FIG. 1) is designed to evaluate 220 (FIG. 3D) at least one part of first data D1 and/or second data D2, security unit 120 being designed, in particular, to infer 222 a context K of a target system 10 (FIGS. 5A, 5B) for device 100, based on the evaluation, security unit 120 being designed, in particular, to influence 224 an execution of the at least one security function SF, based on evaluation 220 and/or on context K, and/or to vary a configuration of security unit 120 and/or the at least one security function SF. In further preferred specific embodiments, evaluation 220 and/or inference 222 and/or influencing 224 may also take place in a cross-protocol and/or hardware-based manner.

Figure 3E:
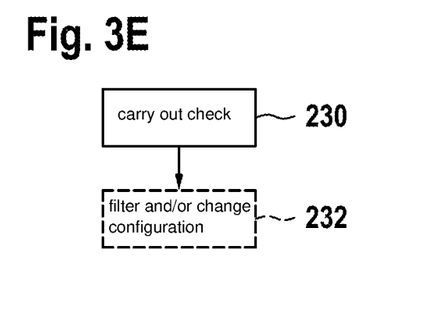

In further preferred specific embodiments (cf. FIG. 3E), it is provided that security unit 120 is designed to carry out a check 230 of data or messages, in particular header information, which are associated with Ethernet-based protocols, in particular DoIP and/or SomeIP and/or TCP/IP. In further preferred specific embodiments, one or multiple of these steps 230 may also be carried out in a cross-protocol and/or hardware-based manner. A filtering and/or changing of the configuration, etc., may be optionally carried out (cf. Step 232).

Figure 3F:
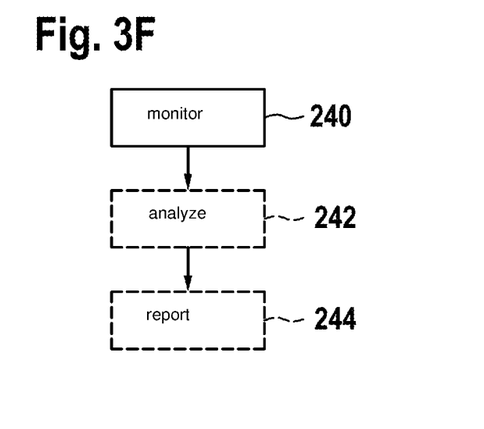

In further preferred specific embodiments (cf. FIG. 3F), it is provided that security unit 120 is designed to monitor 240 and/or analyze 242 and/or report 244 a sequence of multiple, in particular predefinable, messages of first data interface 110_1 and/or second data interface 110_2. In further preferred specific embodiments, one or multiple of these steps 240, 242, 244 may also be carried out in a cross-protocol and/or hardware-based manner.

Figure 3G:
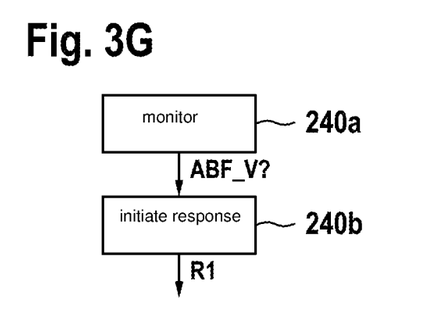

In further preferred specific embodiments (cf. FIG. 3G), it is provided that security unit 120 is designed to monitor 240a whether a predefinable sequence ABF_V of, in particular predefinable, messages occurs at first data interface 110_1 and/or second data interface 110_2, security unit 120 being designed, in particular to initiate 240b a response R1 if predefinable sequence ABF_V does not occur or does not occur within a predefinable time, response R1 including, in particular, at least one of the following elements: a) limiting a data rate of at least one of the at least two data interfaces 110_1, 110_2; b) at least temporarily deactivating at least one of the at least two data interfaces 110_1, 110_2; c) reporting; d) regulating a frequency. In further preferred specific embodiments, one or multiple of these steps 240a, 240b may also be carried out in a cross-protocol and/or hardware-based manner.

Figure 3H:
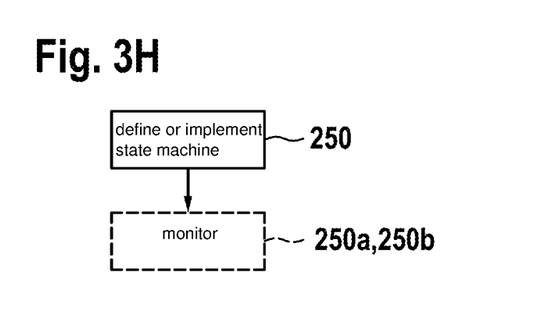

In further preferred specific embodiments (cf. FIG. 3H), it is provided that device 100, 100a, in particular security unit 120, includes at least one state machine ZA1 (cf. FIGS. 1, 4), and/or the device, in particular the security unit, is designed to at least temporarily define 250 (cf. FIG. 3H) or implement at least one state machine ZA1. In further preferred specific embodiments, one or multiple of these steps may also be carried out in a cross-protocol and/or hardware-based manner.

In further preferred specific embodiments, it is provided that the device, in particular the security unit, is designed to monitor 250a (cf. FIG. 3H), with the aid of the at least one state machine ZA1, one or multiple messages of at least one stateful communication protocol, which, in particular, is at least temporarily assignable or assigned to at least one of the two data interfaces 110_1, 110_2, and/or to simulate and/or monitor 250b state sequences of the at least one stateful communication protocol. In further preferred specific embodiments, one or multiple of these steps 250, 250a, 250b may also be carried out in a cross-protocol and/or hardware-based manner.

Figure 3I:
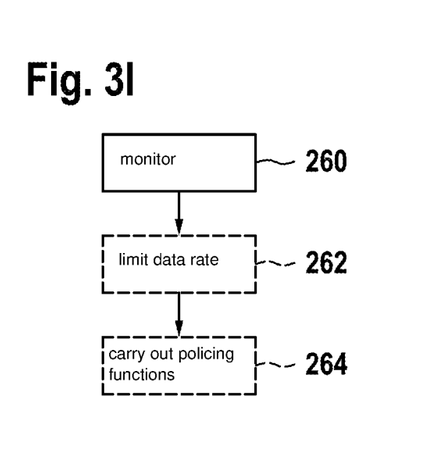

In further preferred specific embodiments (cf. FIG. 3I), it is provided that device 100, 100a, in particular security unit 120, is designed to at least temporarily monitor 260 and/or limit 262 a data rate and/or a packet frequency and/or to carry out 264 further policing functions (e.g., implementing a leaky bucket filter). In further preferred specific embodiments, one or multiple of these steps 260, 262, 264 may also be carried out in a cross-protocol and/or hardware-based manner.

Figure 3J:
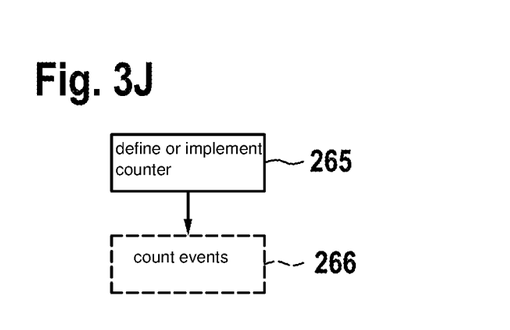

In further preferred specific embodiments (cf. FIG. 3J), it is provided that device 100, 100a, in particular security unit 120, includes at least one counter CNT1 (FIG. 2), and/or the device, in particular the security unit, is designed to at least temporarily define 265 or implement at least one counter CNT1, the device being designed, in particular, to use 266 the at least one counter CNT1 at least temporarily to count events. In further preferred specific embodiments, one or multiple of these steps 265, 266 may also be carried out in a cross-protocol and/or hardware-based manner.

Figure 3K:
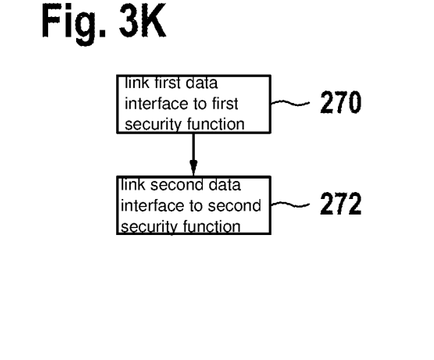

In further preferred specific embodiments (cf. FIG. 3K), it is provided that device 100, 100a, in particular security unit 120, is designed to at least temporarily link 270, 272 the at least one security function SF to at least one of the at least two data interfaces 110_1, 110_2, for example to link 270 first data interface 110_1 (FIG. 1) to a first security function FW and, for example, to link 272 second data interface 110_2 (FIG. 1) to a second security function IDP. In further preferred specific embodiments, one or multiple of these steps 270, 272 may also be carried out in a cross-protocol and/or hardware-based manner. The linking of different data interfaces to the same security function(s) SF in each case is also possible in further preferred specific embodiments.

Figure 3L:
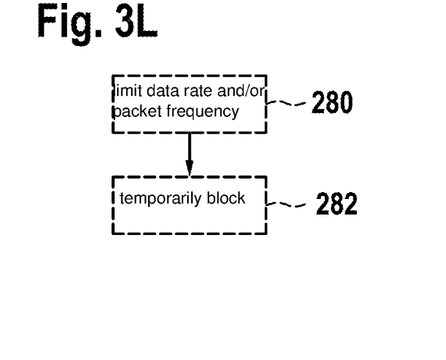

In further preferred specific embodiments (cf. FIG. 3L), it is provided that device 100, 100a, in particular security unit 120, is designed to a) at least temporarily limit 280, for at least one data interface of the at least two data interfaces 110_1, 110_2, a data rate and/or packet frequency of packets arriving at the at least one data interface and/or going out from the at least one data interface; and/or b) at least temporarily block 282 at least one data interface of the at least two data interfaces 110_1, 110_2, denial of service (DoS) attacks on the at least one data interface, in particular, being prevented and/or made more difficult. In further preferred specific embodiments, one or multiple of these steps 280, 282 may also be carried out in a cross-protocol and/or hardware-based manner.

Figure 3M:
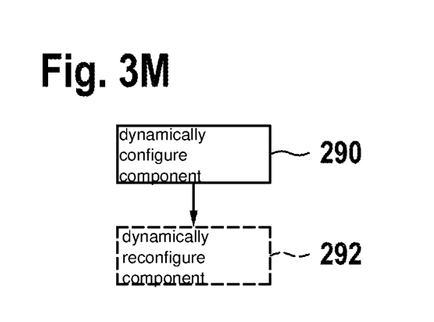

In further preferred specific embodiments (cf. FIG. 3M), it is provided that device 100, 100a, in particular security unit 120, is designed to dynamically configure 290 and/or reconfigure 292 at least one component of the device, in particular security unit 120, cf. optional step 200 according to FIG. 3A. This may take place, for example, using at least one configuration register CFG (FIG. 4) (e.g., implementable in the form of a register memory), to which, e.g., dynamically different configuration data are loadable. In further preferred specific embodiments, one or multiple of these steps 200, 290, 292 may also be carried out in a cross-protocol manner (e.g., changing a firewall configuration for multiple different communication protocols in step 290) and/or a hardware-based manner.

Figure 3N:
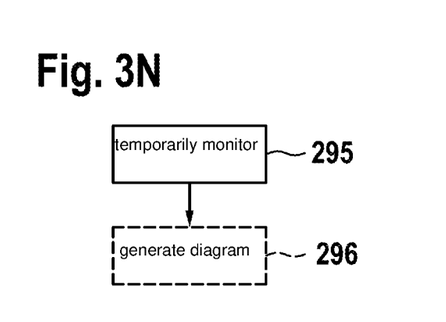

In further preferred specific embodiments (cf. FIG. 3N), it is provided that device 100, 100a, in particular security unit 120, is designed to at least temporarily monitor 295 and/or evaluate a data traffic between at least two data interfaces 110_1, 110_2, . . . , which are each assigned to different communication protocols, the device, in particular the security unit, being designed, in particular, to generate 296 a diagram, in particular a heat map, or data characterizing a diagram, based on the monitored and/or evaluated data traffic. In further preferred specific embodiments, one or multiple of these steps may also be carried out in a cross-protocol and/or hardware-based manner.

In further preferred specific embodiments (cf. FIG. 1), it is provided that the device includes at least one evaluation unit 130, which is designed to evaluate first and/or second data D1, D2 and/or data derived from the first and/or second data, evaluation unit 130 being designed, in particular, to carry out at least one software-based function. The flexibility of device 100 may be further increased thereby. In further preferred specific embodiments, one or multiple of these steps may also be carried out in a cross-protocol manner. In further preferred specific embodiments, the evaluation unit may include, for example, a microcontroller, which is controllable by a computer program.

Further preferred specific embodiments relate to a method for processing data, in particular data packets of different communication protocols, in particular in a vehicle 10 (cf. FIG. 5A), in particular a motor vehicle, including the at least temporary use of at least one device 100, 100a, 100' according to the specific embodiments.

Figure 6:
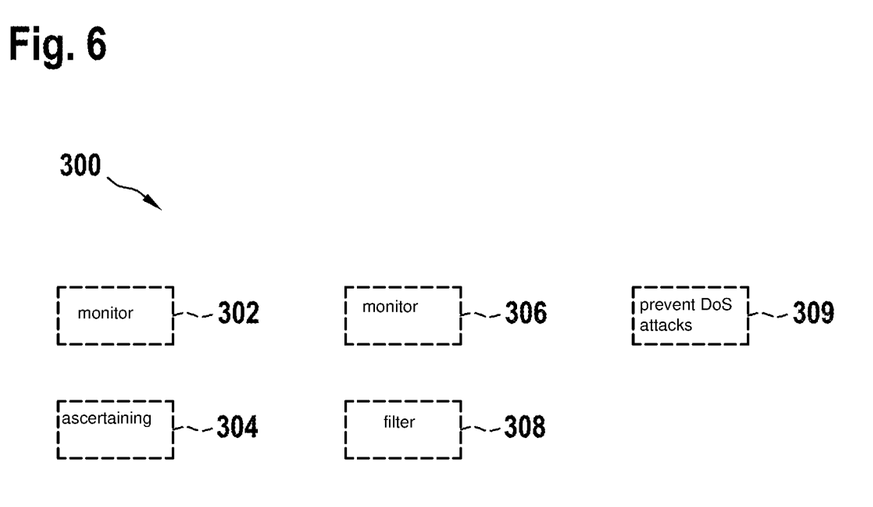
FIG. 6 schematically shows aspects according to further preferred specific embodiments of the present invention.

Further preferred specific embodiments (cf. FIG. 6) relate to a use 300 of the device 100, 100a, 100' according to the specific embodiments and/or the method according to the specific embodiments for at least one of the following elements: a) monitoring 302, in particular hardware-based and/or hardware-accelerated monitoring, of a data traffic, in particular of data packages of different communication protocols, in particular in a vehicle 10, in particular a motor vehicle; b) ascertaining 304 and/or detecting a context of a target system 10; c) hardware-based and/or hardware-accelerated monitoring 306 of a violation of firewall rules; d) hardware-based and cross-protocol filtering 308 of data packets; e) preventing and/or making more difficult 309 denial of service (DoS) attacks, in particular on the at least one data interface 110_1.

Further aspects, advantages and specific embodiments are described below, which, according to further preferred specific embodiments, may be combined with at least one of the specific embodiments described above by way of example, either individually or in combination with each other.

a) Generic, hardware-accelerated filter: Hardware filters may be defined preferably independently of the protocol. Filters may be defined in hardware 120, preferably for any arbitrary protocol, e.g., for CAN, Ethernet, FlexRay, LIN.

b) Vehicle/ECUs (control units) context detection in hardware 120: Vehicle context K is preferably ascertainable by evaluating messages of different bus systems 11', 12', 13' (e.g., "vehicle is in the garage," vehicle is moving," "vehicle is driving autonomously," "an ECU is in diagnostic mode or in a sleep mode (which favors low energy consumption"), etc.). It is preferably possible to dynamically adapt the IDS and FW configuration, depending on vehicle context K.

c) Higher layer protocol filter in hardware 120: Possibility to check higher Ethernet protocol (e.g., DoIP, SomeIP, TCP) header information.

d) Stateful interface monitoring in hardware 120, favors the possibility to monitor, analyze and report or signal the sequence of certain messages to a bus interface 110_1, . . . (or across bus interfaces). For example, the sequence of certain CAN messages may be monitored. If a defined sequence is violated, corresponding countermeasures may be preferably defined in hardware. For example: data rate limitation, deactivation of a port.

e) Stateful protocol monitoring in hardware 120: The possibility to preferably check state sequences of stateful protocols, such as TCP Some/IP and DoIP, and to preferably report anomalies. For example, a state machine ZA1 in HW 120 may preferably check state sequences of stateful protocols with the aid of hardware 120.

f) Policing functionality in hardware 120: Cross-bus policing functionalities, such as leaky bucket filters, data rate limiting/monitoring, packet frequency limiting/monitoring.

g) Counter analysis: Counter CNT1 may be incremented, for example if firewall rules HW are violated. These counters may be preferably further analyzed subsequently in an optional evaluation device 130.

h) Mapping bus interfaces to HW ports: Device 100 preferably has information about the port 110_1, . . . via which certain bus systems 11', 12', 13' and users 11, 12 are connected. This information may preferably be used to link port 110_1, . . . to certain FW filters.

i) Denial of service (DoS) protection: At least one, preferably every, interface 110_1, . . . may be limited in the data rate (or packet rate) on both the ingress and egress side. Each interface (including the optional evaluation device) may be protected thereby against DoS attacks. It is also possible that the connected interfaces are protected against an overload operation by a back-pressure mechanism.

j) Countermeasures in hardware 120: Suitable countermeasures in HW 120 may be used to respond to filter violations or when anomalies are detected, e.g.: blocking a port 110_1, data limiting of a port (on the ingress and/or egress side).

k) Dynamic reconfiguration: The, preferably entire, hardware (HW) configuration, including FW, IDS, IDPS and routing settings, may be dynamically reconfigured at runtime, preferably with the aid of a single configuration. For example: Since the configuration is preferably a cross-protocol one, a single configuration is needed to adapt the firewall, IDS and routing information of all bus systems.

l) Cross-protocol routing heat map: A kind of heat map may preferably be created by evaluating data traffic between different bus systems 11', 12', 13'. Deviations and changes in this heat map during the operating time of a vehicle may indicate anomalies and be used for IDS analyses.

m) Farther-reaching security analysis in software 130: Farther-reaching analysis may be preferably implemented with support from CPU 130 by including the results of HW analyses.

n) A vehicle 10 today is made up of, for example, different functional domains (power train, chassis, safety, body control, infotainment, etc.). In each of these domains, ECUs (control units) are connected to each other via a bus system 11', 12', 13'. The bus system used for communication may vary from one domain to another (CAN, FlexRay, Ethernet, LIN). To permit a communication between the different domains and thus different bus systems, a gateway may be used in further preferred specific embodiments, which may be implemented, for example, with the aid of device 100 or a device 100' integrated into a control unit. In further preferred specific embodiments, device 100 may execute a functionality of at least one switch and/or hub and/or router, which forwards data, for example, between the different vehicle buses 11', 12', 13'.

o) According to further preferred specific embodiments, device 100 may be used to implement a firewall/NIDS system, since the data traffic of multiple domains may be analyzed centrally and checked, for example, for anomalies.

p) According to the specific embodiments, device 100 may be used to implement firewall and IDS functionalities, as well as intrusion detection and prevention system (IDPS) functionalities on a central hardware 100, 120 in a cross-protocol and hardware-accelerated manner; further preferred specific embodiments preferably centralize multiple security mechanisms and preferably add additional hardware firewall, IDS and IDPS capabilities to them for the automotive protocols CAN (FD), Ethernet, FlexRay and LIN, for example (although not exclusively).

q) Further preferred specific embodiments make it possible to implement a cross-protocol, hardware-accelerated firewall with IDS and IDPS functionality, which may possibly be dynamically reconfigured at runtime. Further advantages, which at least some specific embodiments may at least temporarily require, are: the possibility to map firewall rules in central hardware in a cross-protocol manner, carry out IDS analyses and define IDPS countermeasures, relieve an optional CPU 130, e.g., by mapping security mechanisms to HW 120 instead of implementing them in software, the possibility of a comprehensive, cross-bus security filter, analysis and response concept, which may be updated and configured dynamically at runtime using a single configuration, the possibilities of processing firewall checks in a cross-protocol and high-performance manner in HW, the ability to define countermeasures in a cross-protocol manner and in HW.

r) According to further preferred specific embodiments, the following advantages may at least temporarily result by centralizing the security mechanisms on, in particular, central hardware 120: The configuration of FW, IDS and IDPS functionalities may be carried out together with routing information in an all-encompassing configuration for the different bus systems. This configuration is also dynamically possible at runtime, due to an external trigger, preferably protected by a security mechanism. Latencies may furthermore be reduced and IDPS measures executed more efficiently. By combining different bus systems in a single hardware system, device 100 may be used in gateway architectures to implement comprehensive analyses in HW 120 across buses, in particular with regard to IDS. In addition to cross-bus filter and analysis possibilities, further preferred specific embodiments offer the possibility to initiate corresponding countermeasures across buses, for example blocking a port or limiting the data rate, preferably for certain message traffic.

What is claimed is:

1. A device for processing data, comprising:
a gateway of a motor vehicle, the gateway including:
at least two data interfaces, a first data interface of the at least two data interfaces being configured to at least temporarily exchange first data with at least one first external unit according to a first communication protocol, a second data interface of the at least two data interfaces being configured to at least temporarily exchange second data with a second external unit according to a second communication protocol, which is different than the first communication protocol, wherein the first communication protocol includes CAN and/or FlexRay and/or LIN and/or MOST and/or Ethernet; and
a security unit configured to at least temporarily carry out at least one security function with regard to at least one of the at least two data interfaces, wherein the security unit is configured to at least temporarily monitor and/or evaluate data traffic between the first interface and the second interface and to generate a cross-protocol routing heat map based on the monitored and/or evaluated data traffic between the first interface and the second interface, deviations and changes in the cross-protocol routing heat map during operation of the motor vehicle being used by the security unit for intrusion detection, and wherein the security unit is implemented at least partially in hardware.

2. The device as recited in claim 1, wherein the at least one security function includes at least one of the following functions: a) firewall function, b) intrusion detection, c) intrusion prevention, d) intrusion detection and prevention, e) deep packet inspection, f) stateful packet inspection.

3. The device as recited in claim 1, wherein the security unit is configured to execute the at least one security function in a cross-protocol manner and/or a protocol-independent manner.

4. The device as recited in claim 1, wherein the security unit is implemented entirely in hardware.

5. The device as recited in claim 4, wherein the security unit includes at least one of the following elements: a) a hardware circuit; b) a field-programmable gate array c) an application-specific integrated circuit (ASIC).

6. The device as recited in claim 1, wherein the security unit a) includes at least one protocol-independent hardware filter, and/or b) is configured to define the at least one hardware filter, wherein the at least one hardware filter is at least temporarily usable to filter at least one part of the first data and/or the second data and/or further data, wherein the first data and/or the second data are associated with different communication protocols.

7. The device as recited in claim 1, wherein the security unit is configured to evaluate at least one part of the first data and/or of the second data, the security unit being configured to infer a context of a target system for the device, based on the evaluation, the security unit being configured to: (i) influence an execution of the at least one security function, based on the evaluation and/or on the context, and/or (ii) vary a configuration of the security unit and/or the at least one security function.

8. The device as recited in claim 1, wherein the security unit is configured to carry out a check of pieces of header information which are associated with an Ethernet-based protocol, and/or DoIP, and/or SomeIP, and/or TCP.

9. The device as recited in claim 1, wherein the security unit is configured to monitor and/or analyze and/or report a sequence of multiple predefinable messages of the first data interface and/or of the second data interface.

10. The device as recited in claim 9, wherein the security unit is configured to monitor whether a predefinable sequence of the predefinable messages occurs at the first data interface and/or the second data interface, the security unit being configured to initiate a response if the predefinable sequence does not occur or does not occur within a predefinable time, the response including at least one of the following elements: a) limiting a data rate of at least one of the at least two data interfaces, b) at least temporarily deactivating at least one of the at least two data interfaces.

11. The device as recited in claim 1, wherein the security unit includes at least one state machine, and/or the security unit is configured to at least temporarily define or implement the at least one state machine.

12. The device as recited in claim 11, wherein the security unit is configured to monitor, using the at least one state machine, one or multiple messages of at least one stateful communication protocol, which is at least temporarily assignable or assigned to at least one of the at least two data interfaces, and/or to simulate and/or monitor state sequences of the at least one stateful communication protocol.

13. The device as recited in claim 1, wherein the security unit is configured to: (i) at least temporarily monitor and/or limit a data rate and/or packet frequency, and/or (ii) carry out further policing functions.

14. The device as recited in claim 1, wherein the security unit includes at least one counter, and/or the security unit is configured to at least temporarily define or implement the at least one counter, wherein the device is configured to use the at least one counter at least temporarily to count events.

15. The device as recited in claim 1, wherein the security unit is configured to at least temporarily link the at least one security function to at least one of the at least two data interfaces.

16. The device as recited in claim 1, wherein the security unit is configured to: a) at least temporarily limit, for at least one data interface of the at least two data interfaces, a data rate and/or packet frequency of packets arriving at the at least one data interface and/or going out from the at least one data interface, and/or b) at least temporarily block at least one data interface of the at least two data interfaces, to prevent or make more difficult denial of service attacks on the at least one data interface.

17. The device as recited in claim 1, wherein the security unit is configured to configure and/or reconfigure at least one component of the security unit dynamically.

18. The device as recited in claim 1, wherein the device includes at least one evaluation unit which is configured to evaluate the first data and/or the second data and/or data derived from the first data and/or the second data, the evaluation unit being configured to carry out at least one software-based function.

19. A method for processing data packets of different communication protocols in motor vehicle, the method comprising:
providing, in the motor vehicle, a device including a gateway for the motor vehicle, the gateway including:
(i) at least two data interfaces, a first data interface of the at least two data interfaces being configured to at least temporarily exchange first data with at least one first external unit according to a first communication protocol, a second data interface of the at least two data interfaces being configured to at least temporarily exchange second data with a second external unit according to a second communication protocol, which is different than the first communication protocol, wherein the first communication protocol includes CAN and/or FlexRay and/or LIN and/or MOST and/or Ethernet and (ii) a security unit configured to at least temporarily carry out at least one security function with regard to at least one of the at least two data interfaces, wherein the security unit is configured to at least temporarily monitor and/or evaluate data traffic between the first interface and the second interface and to generate a cross-protocol routing heat map based on the monitored and/or evaluated data traffic between the first interface and the second interface, deviations and changes in the cross-protocol routing heat map during operation of the motor vehicle being used by the security unit for intrusion detection, and wherein the security unit is implemented at least partially in hardware; and
at least temporarily using the device.

20. The device as recited in claim 1, wherein the device is used for at least one of the following elements: a) hardware-based and/or hardware-accelerated monitoring, of data packets of different communication protocols in a motor vehicle; b) ascertaining and/or detecting a context of a target system; c) hardware-based and/or hardware-accelerated monitoring of a violation of firewall rules; d) hardware-based and cross-protocol filtering of data packets; e) preventing and/or making more difficult denial of service attacks on the at least one data interface.

\* \* \* \* \*